ABSTRACT OF THE DISCLOSURE

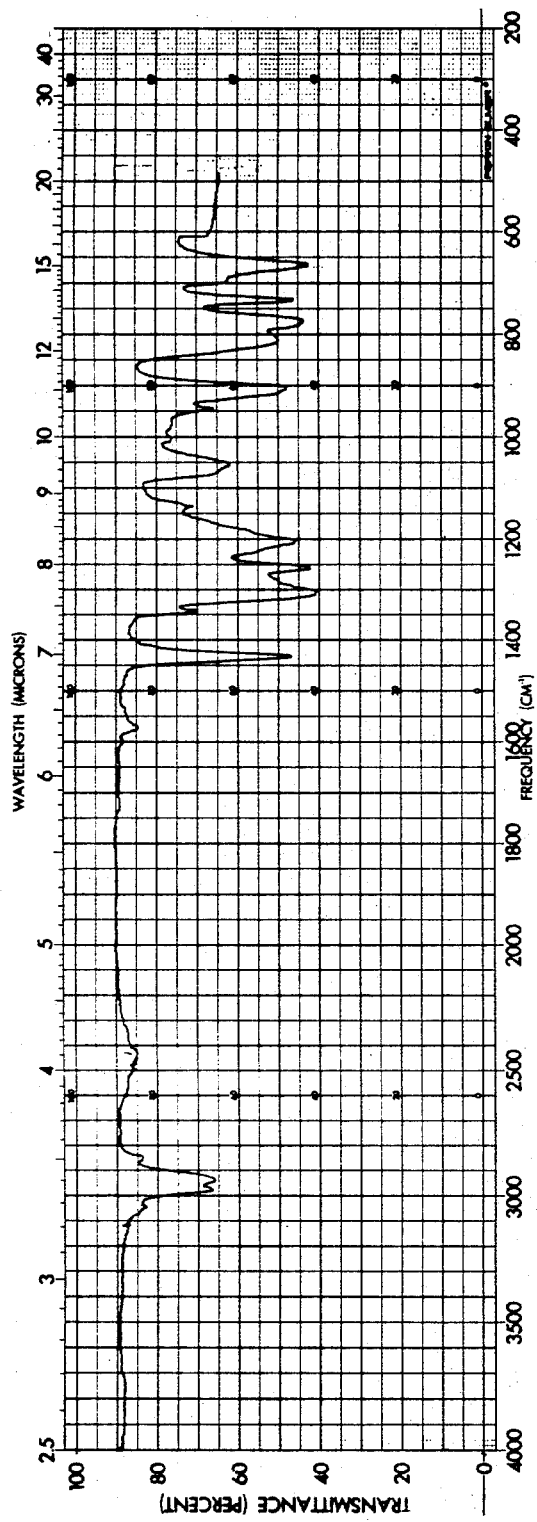
Robert A. Meyers
Edgar R. Wilson
INVENTORS 3,429,859
DICHLOROALICYCLIC SULFIDE POLYMERS
Robert A. Meyers, Encino, and Edgar R. Wilson, Glendale, Calif., assignors to TRW Inc., Redondo Beach, Calif., a corporation of Ohio
Filed Nov. 24, 1967, Ser. No. 685,516
U.S. Cl. 260—79          14 Claims
Int. Cl. C08g 23/00

This invention relates to novel dichloroalicyclic sulfide polymers and to a method of preparing same which comprises reacting a diunsaturated alicyclic compound such as cyclopentadiene with a sulfur chloride to obtain the corresponding dichloroalicyclic sulfide polymers having an average molecular weight of at least 10,000.

---

This invention is directed to the synthesis of novel monomeric and thermoplastic polymeric materials and more particularly to a process for preparing stable, linear polymers from a cyclopentadiene and a sulfur chloride. The poly(dichloroalicyclic sulfide)polymers of this invention have improved mechanical properties and may be used in preparing coatings, laminates, adhesives, and various molded articles.

Presently, the synthetic polyolefins such as polystyrene, etc., form the basis for the predominance of the plastic articles now being manufactured. The polyolefins, particularly polystyrene, have achieved this wide spread utility primarily because of their comparatively low cost, adequate mechanical characteristics, and their ability to be molded, etc. In this respect the polydichloroalicyclic sulfides are comparable in that they are stable and equal to or less than the cost of the aforementioned olefins. Moreover, the polymers of this invention are particularly outstanding in that they are self-extinguishing due to the high percentage of chlorine. Thus, the combination of low cost and the property of being self-extinguishing provide a significant advantage over similar resins known heretofore. In general, it is known that in order to improve the plastic characteristics of a polymeric material its is necessary to increase the molecular weight which is achieved by increasing the number of repeating units in the molecule. One of the basic goals of polymer preparation is to link more repeating units to improve the tensile strength, toughness, elasticity, etc., which depends on the molecular weight of the polymer. Thus, it was unexpected to find that the molecular weights of the polymers of this invention are sufficiently high so that they may be used with complete satisfaction in the plastic industry.

Accordingly, it is an object of this invention to provide thermoplastic polymers obtained by reacting a mono or dicyclopentadiene with a sulfur chloride to obtain linear polymers which have an average molecular weight of at least 10,000.

It is another object of this invention to provide a method of preparing stable polymers obtained by reacting a mono or dicyclopentadiene with a sulfur chloride which are particularly useful in preparing molded articles with adequate mechanical properties.

It is still another object of this invention to provide self-extinguishing poly(dichloroalicyclic sulfide)polymers having an average molecular weight of at least 10,000, which are capable of being used to prepare films, coatings, adhesives, and molded articles of adequate mechanical and chemical properties.

These and other objects of the invention will become apparent from a further and more detailed description of the invention as follows. In the drawings:

FIGURE 1 is an infrared spectrum of the novel polymers of this invention.

The dichloroalicyclic sulfide and disulfide polymers are prepared by reacting a diunsaturated alicyclic compound selected from the group consisting of cyclopentadiene, dicyclopentadiene, and a halogen or lower alkyl substituted cyclopentadiene or dicyclopentadiene with a sulfur chloride to obtain linear dichloroalicyclic sulfide and disulfide polymers with an average molecular weight of at least 10,000. The cyclopentadienes are reacted on a molar basis from about $-20°$ C. up to about room temperature.

The cyclopentadienes for purposes of this invention may be characterized as cyclic diolefins and particularly include cyclopentadiene and dicyclopentadiene or the halogen e.g., chlorine and the lower alkyl substituted cyclopentadienes and dicyclopentadienes such as methylcyclopentadiene and methyldicyclopentadiene. The alkyl substituted derivatives of the cyclopentadienes or dicyclopentadienes may have alkyl substituents of 1 to 3 carbon atoms and include, for example, methylcyclopentadiene, ethylcyclopentadiene, propylcyclopentadiene, etc.

The amount of sulfur chloride, either sulfur monochloride or sulfur dichloride which may be chemically reacted with the cyclopentadienes to form the corresponding polymers is proportional to the unsaturation of the diene, i.e., the number of double bonds per unit weight which is approximately one mole of sulfur chloride for each mole of mono or dicyclopentadiene. The reaction temperature most suitable for the preparation of the polymers is about $-20°$ C., but the temperature may range to about room temperature or above for periods of from about 2 to 24 hours. In any event, the reaction temperature and time is maintained to insure a reaction between the cyclodiene and the sulfur chloride so as to obtain addition of the sulfur and chlorine atoms to the double bonds of the ring and to insure a high molecular weight.

In addition, it has been found to be specially advantageous to add to the reaction mixture a suitable diluent which is non-reactive with the sulfur chloride. When the reaction is carried out in a closed vessel, 5 to 100% by weight of a low boiling solvent including the paraffinic, naphthenic, or aromatic solvents may be used to control the reaction. The preferred solvents, however, include for example methylene chloride, tetrachloroethane, carbon tetrachloride, chloroform, chlorobenzene, nitrobenzene, fluorotrichloromethane, tetrachloroethylene, toluene, petroleum ether, and the like.

In carrying out the synthesis, it is desirable to mix the diene in one portion of the solvent e.g., approximately 80% of the total amount and the sulfur chloride in the remaining portion. Subsequently, the diene solution, in a closed flask, is cooled to approximately $-20°$ C. and the sulfur chloride solution is added dropwise while the temperature is maintained. The final polymers depending upon the amount of sulfur chloride added to the unsaturation of the dienes may be characterized as hard thermoplastic resins with softening points of about $60°$ C., and in some cases may range as high as $200°$ C. as determined by the ASTM ring and ball method depending upon the particular reactants and conditions employed.

The addition of sulfur dichloride or monochloride to cyclodienes in accordance with this invention may be illustrated by the following reactions:

I.
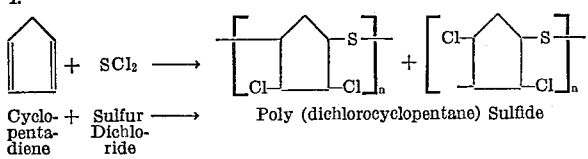
Cyclo- + Sulfur ⟶ Poly (dichlorocyclopentane) Sulfide
penta-  Dichlo-
diene   ride II.
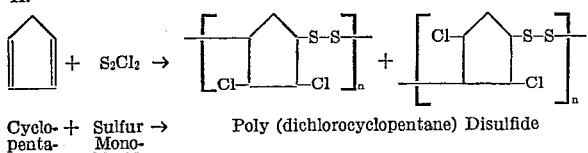
Cyclo- + Sulfur → Poly (dichlorocyclopentane) Disulfide
penta-  Mono-
diene   chloride III.
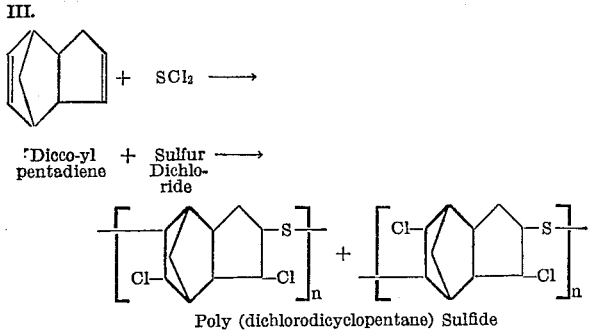
Dicco-yl + Sulfur ⟶
pentadiene Dichlo-
           ride Poly (dichlorodicyclopentane) Sulfide IV.
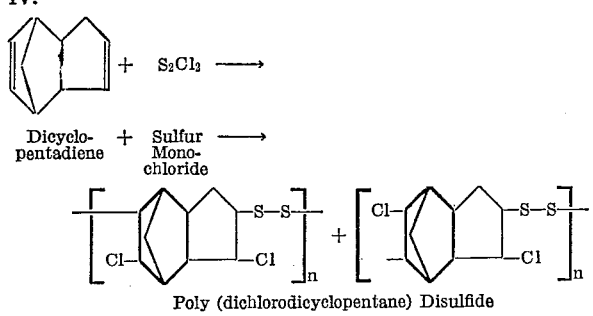
Dicyclo- + Sulfur ⟶
pentadiene Mono-
           chloride Poly (dichlorodicyclopentane) Disulfide It should be noted from the above reactions that contrary to what may be expected, the chlorine and sulfur atoms react intermolecularly and not intramolecularly with the double bonds of the diene to form monomers which are capable of polymerizing to resins having an average molecular weight of at least 10,000. Thus, $n$ in the formulae has a value so that the number of recurring units form polymers having an average molecular weight of at least 10,000.

The following examples illustrate the methods employed in preparing the polymers in accordance with this invention.

Example 1

To a solution of 67.3 parts by weight (1.02 M) of cyclopentadiene in 300 parts by weight of methylene chloride in a one liter, three necked, round bottom flask which was equipped with a thermometer, dropping funnel, and a magnetic stirrer, was added a solution of 107.8 parts by weight (1.02 M) of freshly distilled sulfur dichloride in 300 parts by weight of methylene dichloride over a period of one hour while the temperature was maintained at about −20° C. by means of a Dry Ice-acetone bath. When the addition was completed, the reaction vessel was transferred to a freezer and maintained at about −20° C. for about twenty four hours. At the end of this time, the reaction mixture was allowed to warm to room temperature and the solvent was removed by vacuum stripping. The product was characterized as a yellow to yellow-brown polymer which softens at about 35° C. The polymer was then recoagulated from methylene chloride-petroleum ether with a 66 percent yield of a yellow-white polymer having a softening point of 65° C.

The total product yield was approximately 169.3 parts by weight (96.7%). The inherent viscosity was 0.30 (0.5% solution in dimethylacetamide). A thermagravimetric analysis gave a residue of 35 percent at 800° C. with the first break occurring at 200° C.

The elemental analysis of the product was as follows.

| Elements: | Percent |
|---|---|
| Carbon | 35.92 |
| Hydrogen | 3.93 |
| Sulphur | 18.38 |
| Chlorine | 39.20 |

The theoretical chemical analysis of the polymer $(C_5H_6SCl_2)_n$ was calculated as carbon 35.52%, hydrogen 3.58%, sulfur 18.96%, and chlorine 41.94%. The infrared spectrum (FIGURE 1) showed the absence of double bonds, as expected, for the polymer.

Example 2

Approximately 4.50 parts by weight of the polymer of Example 1 was mixed with about 0.25 part by weight of MgO and 0.25 part by weight of ZnO and pressed into a 1-inch diameter die at 100° C. at 1000 p.s.i.g. to obtain a consolidated plug. The plug had a Barcol hardness of 23, a compressive strength of 9100 p.s.i. and a compressive modulus of 220,000 p.s.i. In addition, the flame test showed that the polymer was flame retardant in that it immediately stopped burning when removed from a flame.

Example 3

To a solution of 132.2 parts by weight (1.0 M) of distilled dicyclopenetadiene in 300 parts by weight of methylene dichloride in a one liter, three-necked, round bottom flask equipped with a thermometer, dropping funnel, and magnetic stirrer was added a solution of 103.0 parts by weight (1.0 M) of distilled sulfur dichloride in 300 parts by weight of methylene dichloride over a period of about one hour while the temperature was maintained at about a −20° C. by means of an ice bath. After standing overnight at room temperature, the reaction mixture was stripped of solvent under a vacuum. The product yield was approximately 98 percent. The product was characterized as a dark brown polymer which softened over the temperture range of 350° to 450° F.

As shown by thermogravimetric analysis, the polymers were thermally stable at temperatures above 200° C. The thermal stabilities of the polymer is indicated by the thermogravimetric analysis (TGA) which measures the weight change as a function of temperature.

The polymers of this invention may be compression or injection-molded near or in the presence of small amounts e.g., 1 to 2% by weight of a metal oxide including magnesium oxide, barium oxide, calcium oxide, zinc dust, or a small amount of plasticizer such as dioctyl phthalate to give hard plastic articles of manufacture. For the most parts, the metal oxides serve as a stabilizing agent for the little chlorine which is released during the molding processes.

While this invention has been described with respect to a number of specific embodiments, it is obvious that there are other variations and modifications which can be resorted to without departing from the spirit of the invention as particularly pointed out in the appended claims.

We claim:
1. Thermoplastic flame-retardant polymers obtained by reacting diunsaturated alicyclic compounds selected from the group consisting of cyclopentadiene, dicyclopentadiene, and the halogen or lower alkyl substituted cyclopentadienes or dicyclopentadiene with a sulfur chloride to ob- tain linear dichloroalicyclic sulfide polymers having an average molecular weight of at least 10,000.

2. The thermoplastic polymers of claim 1 obtained by reacting a cyclopentadiene with sulfur dichloride to obtain linear dichloroalicyclic sulfide polymers comprising monomeric units of:

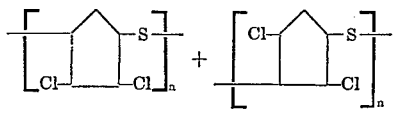

3. The thermoplastic polymers of claim 1 obtained by reacting a cyclopentadiene with sulfur monochloride to obtain linear dichloroalicyclic disulfide polymers comprising monomeric units of:

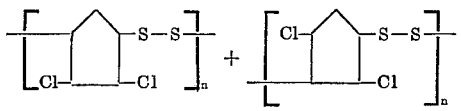

4. The thermoplastic polymers of claim 1 obtained by reacting a dicyclopentadiene with sulfur dichloride to obtain linear dichloroalicyclic sulfide polymers comprising monomeric units of:

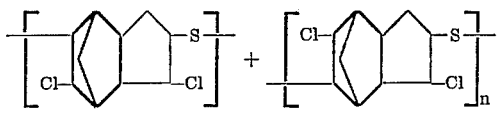

5. The thermoplastic polymers of claim 1 obtained by reacting a dicyclopentadiene with sulfur monochloride to obtain linear dichloroalicyclic disulfide polymers comprising monomeric units of:

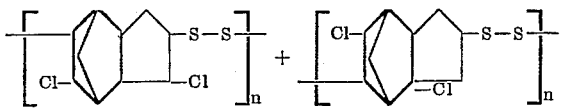

6. The thermoplastic polymers of claim 1 further characterized as being obtained by reacting a lower alkyl substituted cyclopentadiene with a sulfur chloride to obtain the linear dichloroalicyclic sulfide polymers.

7. The thermoplastic polymers of claim 1 further characterized as being obtained by reacting a lower alkyl substituted dicyclopentadiene with a sulfur chloride to obtain the linear dichloroalicyclic sulfide polymers.

8. The thermoplastic polymers of claim 7 further characterized in that the lower alkyl substituent is a methyl group.

9. The thermoplastic polymers of claim 1 further characterized as being obtained by reacting a halogen substituted cyclopentadiene with a sulfur chloride to obtain the linear dichloroalicyclic sulfide polymers.

10. The thermoplastic polymers of claim 1 further characterized as being obtained by reacting a halogen substituted dicyclopentadiene with a sulfur chloride to obtain the linear dichloroalicyclic sulfide polymers.

11. A process for preparing thermoplastic flame-retardant polymers which comprises reacting approximately one mole of a diunsaturated alicyclic compound selected from the group consisting of cyclopentadiene, dicyclopentadiene, and the halogen or lower alkyl substituted cyclopentadienes or dicyclopentadiene with about one mole of a sulfur chloride to obtain linear dichloroalicyclic sulfide polymers having an average molecular weight of at least 10,000.

12. The process of claim 11 further characterized in that the sulfur chloride is selected from a group consisting of sulfur monochloride and sulfur dichloride.

13. The process of claim 11 further characterized in that the reaction takes place in the presence of an organic solvent.

14. The process of claim 13 further characterized in that the organic solvent is selected from the group consisting of methylene chloride, tetrachloroethane, carbon tetrachloride, chloroform, chlorobenzene, nitrobenzene, fluorotrichloromethane, tetrachloroethylene, toluene, and petroleum ether.

References Cited

UNITED STATES PATENTS 2,411,275 11/1946 Kinneberg et al. _____ 260—79
3,227,695 1/1966 Landrum et al. _____ 260—79

DONALD E. CZAJA, *Primary Examiner.*

M. I. MARQUIS, *Assistant Examiner.*

U.S. Cl. X.R.

117—161; 260—31.8, 32.4, 33.6, 33.8, 37

UNITED STATES PATENT OFFICE
CERTIFICATE OF CORRECTION

Patent No. 3,429,859                                            February 25, 1969

Robert A. Meyers et al.

It is certified that error appears in the above identified patent and that said Letters Patent are hereby corrected as shown below:

Column 4, line 57, "near" should read -- neat --.

Signed and sealed this 31st day of March 1970.

(SEAL)
Attest:

Edward M. Fletcher, Jr.                          WILLIAM E. SCHUYLER, JR.
Attesting Officer                                            Commissioner of Patents